3,600,302
LUBE EXTRACTION WITH MIXED SOLVENTS
Charles C. Hong, Sarnia, Ontario, Canada, assignor to Esso Research and Engineering Company
No Drawing. Filed Apr. 3, 1969, Ser. No. 813,334
Int. Cl. C10g 21/02
U.S. Cl. 208—323          16 Claims

ABSTRACT OF THE DISCLOSURE

An improved process for the solvent extraction of petroleum oil fractions. A two-component mixed solvent, where Component A comprises a polar solvent and Component B comprises a glycol ether, is used to selectively extract the more aromatic type constituents from a lube oil feed. Results obtained with these mixed solvents are compared with phenol and aqueous phenol.

BACKGROUND OF THE INVENTION

Field of the invention

The present invention relates to the separation of polar components from petroleum distillate fractions. More particularly, this invention relates to an improved process for extraction of lube oil distillates using a mixed solvent with a preferential selectivity for the more polar type constituents.

Description of the prior art

It is well known in the art that solvent extraction may be utilized to separate aromatics from lube oil distillates containing aromatics and saturates in order to improve oxidation stability, color, and viscosity index (V.I.). It is also known that this may be accomplished by contacting hydrocarbon fractions with a solvent which has preferential selectivity for the more polar type hydrocarbon compounds.

In a typical liquid extraction process the degree of separation depends on several factors in addition to the characteristics of the solvent itself. Thus, for example, the greatest possible contacting is sought between the feed and the solvent in order that the solvent can selectively separate the solute. This may be accomplished, for example, in a single batch extraction unit or a countercurrent extraction unit.

There are three important factors affecting this procedure. The first of these is the number of theoretical or actual plates or stages. The number of such plates or stages required to obtain a given degree of separation, as determined by yield-quality relationships, depends on the selectivity characteristics of the solvent, more selective solvents requiring a fewer number of extraction stages than the less selective ones.

The two remaining factors, namely the treat or solvent/ oil ratio, and the extraction temperature, are interrelated. The minimum quantity of solvent which can be used for extraction depends on the solubility of the solvent in the oil, and the maximum quantity depends on the solubility of the oil in the solvent, as otherwise the separation into two phases would be impossible. In addition, it must be borne in mind that the miscibility of the two phases is directly related to the solution temperature. For most systems, the mutual solubility of the two partially miscible phases increases as the solution temperature increases and above the critical solution temperature they become completely miscible and there is no separation. In general, however, within the region of partial miscibility, if the temperature is increased, the amounts of the oil dissolved in the extract phase and of the solvent dissolved in the raffinate phase are also increased. The importance of temperature is further shown by the fact that the solvent power always increases with the increase in temperature until complete miscibility is reached, but the selectivity usually decreases gradually over a certain temperature range, and then decreases rapidly as the miscibility region is approached.

It is widely known in the art to use phenol in the solvent extraction of lube oils. In such extractions, the oil is contacted with phenol which may be either anhydrous or contain a few percent of water, usually at 110° to 200° F. depending on the characteristics of the stock, although some oils may require temperatures as high as 250° F.

As is well known in the art, the use of phenol as a selective extraction solvent has been effective in upgrading lube oil stocks. Notwithstanding, the search for a more effective solvent has continued. For example, there would be important economic advantages to be derived from the use of a solvent which results in higher yields and which gives a better solvent separation.

SUMMARY OF THE INVENTION

It is an object of this invention to provide an improved solvent extraction process for the separation of hydrocarbons. A further object of this invention is to provide an improved process for the selective extraction of polar hydrocarbons from hydrocarbon mixtures. It is a further object of this invention to provide an improved process for the separation of aromatic-type hydrocarbons from their mixtures with nonaromatic hydrocarbons. It is a still further object of this invention to provide a process for the separation of condensed and alkyl-substituted benzenoids from a mixture of the same with paraffinic and naphthenic hydrocarbons. A further object of this invention is to provide a new and improved selective solvent to carry out the above-mentioned processes. A still further object of this invention is to provide a selective solvent which may be more readily recovered after being used to extract aromatics from a lube oil feed. These and other objects and advantages of this invention will be easily discerned from the ensuing description thereof.

It has now found that certain mixed solvents exhibit an improved selectivity for the extraction of polar compounds, including aromatics, from a hydrocarbon feed consisting of petroleum distillate fractions.

In accordance with this invention, petroleum distillate fractions are contacted with a mixed solvent comprising two components, including a polar solvent and a glycol ether having the general formula:

$$R—(OCH_2CH_2)_n—OH$$

where R is lower alkyl, preferably methyl or ethyl, and $n$ is a positive integer from 1 to 2, under conditions such that both the oil feed and the mixed solvent are in the liquid phase. Extract and raffinate phases are thus formed, the mixed solvent is recovered from the extract phase and improved hydrocarbon oil from the raffinate phase. More particularly, the mixed solvent which is employed in this liquid-liquid contacting procedure comprises phenol in combination with mono- and diethylene glycol monoalkyl ethers.

DETAILED DESCRIPTION

In order to produce the required contacting, a typical solvent extraction process, as is known in the art, may be utilized. In such a system, the feed and solvent are mixed in an extraction zone, which may consist of any suitable means to obtain thorough mixing and settling. This includes mechanical agitation in a batch extractor or a cocurrent, countercurrent, or crosscurrent system, in one or more stages. This system, or any other suitable to achieve intimate contacting may be employed. Utilizing any conventional separation process, such as distillation, the mixed solvent may be recovered from the two phases, and recycled.

The mixed solvents employed in conjunction with the invention consist of a two-component system, comprising Components A and B.

Component A is a polar solvent, boiling between 250° and 450° F., but below the usual lube oil range, and having an appreciable dipole movement, preferably between 1 and 5 Debyes. It has a relatively high specific gravity (greater than 0.95) and a low viscosity (less than 10 centistokes) at the extraction temperature for rapid coalescence. The critical solution temperature of Component A with the distillates is about 120° to 300° F. More particularly, it is an organic compound having a 5- or 6-member ring, either carbocyclic or heterocyclic, and containing a polar functional group, such as a hydroxyl, carbonyl, etc. It is partially miscible with lube oils at extraction temperatures and is generally quite immiscible with lube oils at room temperature. More particularly, the preferred Component A employed in conjunction with this invention is phenol. Component A has a critical solution temperature with the distillate which is about 150° to 250° F.

Component B employed in conjunction with this invention is a straight-chain organic compound whose desired physical properties are similar to those of Component A. However, Component B should be more immiscible than Component A with a given lube distillate. The critical solution temperature of Component B is preferably 10° to 200° F. higher than that of Component A. Component B is completely miscible with Component A at the extraction temperature. More particularly, Component B is a glycol ether having the general formula:

$$R-(OCH_2CH_2)_n-OH$$

where R is lower alkyl, preferably methyl or ethyl, and $n$ is 1 or 2. Still more particularly, Component B used in conjunction with this invention will be diethylene glycol monomethyl ether (methyl Carbitol), ethylene glycol monomethyl ether (methyl Cellosolve), diethylene glycol monoethyl ether (ethyl Carbitol), and mixtures thereof. Methyl Carbitol is preferred.

In addition, Component B will have a heat of vaporization which is lower than that of water (970 B.t.u./lb.), and preferably from between 100 and 300 B.t.u./lb., so that when used in conjunction with phenol, these solvents will be more economically recovered by distillation than would be the case where water is used in conjunction with phenol.

The mixed solvent comprises about 75 to 98% by volume of Component A and about 25 to 2% by volume of Component B; or, that is, where the ratio of Component A to Component B is between 3 and 50.

The process disclosed herein is designed to remove the more polar compounds from a feed consisting of a mixture of hydrocarbons. Specifically, that is, to separate the more aromatic type constituents from a feed containing a mixture of said constituents with nonaromatic, or paraffinic and naphthenic, hydrocarbons. More particularly, such feeds will consist of petroleum distillate fractions. In general, these distillate fractions will have a boiling range within the broad range of about 400° to about 1200° F. The preferred distillate fractions are the lubricating oil fractions boiling within the range of 500° and 1100° F., containing between 5% and 70% polar aromatic compounds including benzenes, naphthalene, anthracenes, and phenanthrenes, and with aromatic compounds which range from $C_{15}$ to $C_{50}$. These fractions may come from any source, such as the paraffinic crudes obtained from Aramco, Kuwait, the Panhandle, north Louisiana, western Canada, etc.

This extraction process is to be carried out at a temperature such that the feed and the mixed solvent both remain in the liquid phase. In addition, the conditions must be such that feed and mixed solvent are partially miscible. Thus, the extraction temperature is limited by the boiling points of the constituents, and further limited by the critical solution temperatures of feed and mixed solvent. More particularly, it has been found that certain temperatures within the range thus provided are economically more attractive. Specifically, extraction temperature ranges for the various mixed solvents to be employed in conjunction with this invention are from about 100° to 300° F. It is noted that the temperature ranges employed are different for the different solvents. Specifically, for the following mixed solvent systems, the temperature ranges to be employed are as follows:

TEMPERATURE RANGES FOR SOLVENT EXTRACTION

| Mixed solvent | SAE grade of oil [1] | Temperature (° F.) | |
|---|---|---|---|
| | | Critical solution | Range for extraction |
| Phenyl plus methyl Cellosolve | 10 | 200–250 | 100–200 |
| Do | 30 | 230–300 | 150–250 |
| Phenol plus methyl Carbitol | 10 | 200–270 | 100–220 |
| Do | 30 | 230–320 | 150–270 |
| Phenol plus ethyl Carbitol | 10 | 200–300 | 100–250 |
| Do | 30 | 230–350 | 150–300 |

[1] Western Canada paraffin distillates.

The amount of mixed solvent to be employed in conjunction with this invention may vary over a wide range. It is limited, at any given extraction temperature, by the solubility of the mixed solvent in the oil on the one hand, and by the solubility of the oil in the mixed solvent on the other, and in addition, by economic considerations. More particularly, it is preferred that the amount of the mixed solvent utilized, as shown by the treat, or solvent/oil ratio, be between 50 and 500 volume percent.

In conjunction with the present invention, it is noted that, except at very high pressures, the influence of pressure on the liquid-liquid equilibrium is small. But, this invention does assume the use of a sufficiently high operating pressure to maintain a completely condensed system; that is, above the vapor pressures of the solutions.

DESCRIPTION OF THE PREFERRED EMBODIMENT

This invention will be more apparent from the preferred embodiment and working examples set forth below. In a preferred form, a mixture of phenol and glycol ether will be employed as the mixed solvent herein. In a most preferred form, the mixed solvent comprises 2 to 25% by volume of glycol ether and 75 to 98% by volume of phenol.

Within the extraction unit, the temperature to be employed for each of the solvents in question are from 100° to 300° F. At these conditions, the actual number of gallons/hour of the mixed solvent and feed streams will depend upon the scale of the operation (i.e., commercial scale or pilot scale) and the particular size of the unit utilized, but the treat, or solvent/oil ratio employed, will be between 50 and 500%, and from 1 to 20 stages may be utilized.

The feed stream consists of lubricating oil fractions boiling within the range of 500° and 1100° F., containing between 5% and 70% aromatics, said aromatics ranging from $C_{15}$ to $C_{50}$.

The two immiscible phases which are then formed are separated, and the mixed solvent in each phase may be separated by any conventional means, such as distillation.

The preferred embodiment is further illustrated by the following examples:

Example 1.—This example illustrates the method used to determine the selectivity and solvent power of the mixed solvent system of phenol and methyl Carbitol when used in conjunction herewith. Thirty ml. of waxy 30-grade Western Canadian distillates of differing saturates/aromatics contents were mixed with phenol and methyl Carbitol, at various ratios thereof, in a batch extractor at atmospheric pressure at 180° F., which was below the critical solution temperatures of the particular mixed solvent system and distillate employed. After the mixture settled and raffinate and extract phases were separated, compositions of each were determined. The refractive index of the oil and the weight percent of solvent phase were determined as well as the dewaxed (pour point 25° F.) viscosity index of the raffinate oil. A ternary diagram for the mixed solvent-oil system was then constructed from these phase-equilibrium data according to the method of T. G. Hunter and A. W. Nash, Ind. Eng. Chem., 27, 836 (1935). The data for each system employed were as follows:

| System | Phenol/methyl Carbitol | Extraction temp., °F. |
|---|---|---|
| A | 95 wt. percent/5 wt. percent | 180 |
| B | 85 wt. percent/15 wt. percent | 180 |
| C | 75 wt. percent/25 wt. percent | 180 |

The phase-equilibrium data obtained for each system are given in Table I.

TABLE I

| | Raffinate phase | | | Extract phase | |
|---|---|---|---|---|---|
| System | Refractive index of oil at 140° F. | Dewaxed viscosity index of oil | Mixed solvent (wt. percent) | Refractive index of oil at 140° F. | Mixed solvent (wt. percent) |
| A | 1.4661 | 94.0 | 12.0 | 1.4848 | 94.6 |
|  | 1.4738 | 81.6 | 16.6 | 1.5229 | 87.6 |
|  | 1.4982 | 51.8 | 31.7 | 1.5285 | 68.9 |
| B | 1.4665 | 93.3 | 10.7 | 1.4868 | 96.6 |
|  | 1.4747 | 80.3 | 13.1 | 1.5324 | 90.3 |
|  | 1.4855 | 65.7 | 16.4 | 1.5440 | 85.7 |
|  | 1.5002 | 50.0 | 23.3 | 1.5446 | 75.8 |
| C | 1.4671 | 92.3 | 7.9 | 1.4886 | 97.4 |
|  | 1.4750 | 80.0 | 9.7 | 1.5350 | 92.4 |
|  | 1.4855 | 65.7 | 11.9 | 1.5526 | 88.8 |
|  | 1.4998 | 50.2 | 16.3 | 1.5562 | 81.8 |

By use of established correlations between countercurrent plant extraction operations and ternary diagrams, it was found that the continuous countercurrent extraction of a 30-grade distillate as per System A gives a 61 volume percent yield of waxy raffinate oil of 90 viscosity index at 120 volume percent treat in three ideal extraction stages.

System B gives a 68 volume percent yield of waxy raffinate oil of 90 viscosity index at 155 volume percent treat in five ideal extraction stages.

System C gives a 73 volume percent yield of waxy raffinate oil of 90 viscosity index at 200 volume percent treat in four ideal extraction stages.

These results may be compared with those obtained utilizing anhydrous phenol and aqueous phenol to extract the same distillate at 180° F. in approximately the same number of ideal stages. With anhydrous phenol a yield of only 54 volume percent of 90 viscosity index waxy product is obtained with a treat of 145 volume percent. With aqueous phenol containing 5% water, a yield of 64 volume percent of 90 viscosity index waxy product is obtained with a high treat of 295 volume percent. With aqueous phenol containing 10% water, a yield of 66 volume percent of 90 viscosity index waxy product is obtained with an extremely high treat of 565 volume percent.

Example 2.—This example illustrates the method used to determine the selectivity and solvent power of the mixed solvent system of phenol and ethyl Carbitol when used in conjunction herewith. Thirty ml. of waxy 10-grade western Canadian distillates of differing saturates/aromatics contents were mixed with phenol and ethyl Carbitol, at various ratios thereof, in a batch extractor at atmospheric pressure at 140° F., which was below the critical solution temperatures of the particular mixed solvent system and distillate employed. After the mixture settled and raffinate and extract phases were separated, compositions of each were determined. The refractive index of the oil and the weight percent of solvent in each phase were determined, as well as the dewaxed (pour point 0° F.) viscosity index of the raffinate oil. A ternary diagram for the mixed solvent-oil system was then constructed from these phase-equilibrium data according to the method of T. G. Hunter and A. W. Nash, Ind. Eng. Chem., 27, 836 (1935). The data for each system employed were as follows:

| System | Phenol/ethyl Carbitol | Extraction, temp., °F. |
|---|---|---|
| A | 95 wt. percent/5 wt. percent | 140 |
| B | 85 wt. percent/15 wt. percent | 140 |
| C | 75 wt. percent/25 wt. percent | 140 |

The phase-equilibrium data obtained for each system are given in Table II.

TABLE II

| | Raffinate phase | | | Extract phase | |
|---|---|---|---|---|---|
| System | Refractive index of oil at 140° F. | Dewaxed viscosity index of oil | Mixed solvent (wt. percent) | Refractive index of oil at 140° F. | Mixed solvent (wt. percent) |
| A | 1.4580 | 93.0 | 9.9 | 1.4825 | 93.6 |
|  | 1.4633 | 83.3 | 11.6 | 1.5094 | 88.9 |
|  | 1.4700 | 73.0 | 13.0 | 1.5231 | 84.2 |
|  | 1.4835 | 57.1 | 20.0 | 1.5278 | 72.4 |
| B | 1.4585 | 92.1 | 5.5 | 1.4840 | 95.0 |
|  | 1.4641 | 82.8 | 7.4 | 1.5170 | 90.4 |
|  | 1.4703 | 72.5 | 10.0 | 1.5296 | 86.5 |
|  | 1.4817 | 59.1 | 11.2 | 1.5386 | 80.8 |
| C | 1.4591 | 91.1 | 5.4 | 1.4871 | 94.6 |
|  | 1.4655 | 80.5 | 5.6 | 1.5239 | 92.0 |
|  | 1.4718 | 69.9 | 7.5 | 1.5380 | 88.6 |
|  | 1.4862 | 54.1 | 9.9 | 1.5522 | 83.0 |

By use of established correlations between countercurrent plant extraction operations and ternary diagrams, it was found that the continuous countercurrent extraction of a 10-grade distillate as per System A gives a 74 volume percent yield of waxy raffinate oil of 90 viscosity index at 100 volume percent treat in four ideal extraction stages.

System B gives a 75 volume percent yield of waxy raffinate oil of 90 viscosity index at 140 volume percent treat in four ideal extraction stages.

System C gives a 77 volume percent yield of waxy raffinate oil of 90 viscosity index at 165 volume percent treat in three ideal extraction stages.

These results may be compared with those obtained utilizing anhydrous phenol and aqueous phenol to extract the same distillate at 140° F. in approximately the same number of ideal stages. With anhydrous phenol, a yield of only 68 volume percent of 90 viscosity index waxy product is obtained with a treat of 115 volume percent. With aqueous phenol containing 5% water, a yield of 75 volume percent of 90 viscosity index waxy product is obtained with a high treat of 280 volume percent. With aqueous phenol containing 10% water, a yield of 77 volume percent of 90 viscosity index waxy product is obtained with an extremely high treat of 415 volume percent.

Example 3.—This example illustrates the method used to determine the selectivity and solvent power of the mixed solvent system of phenol and methyl Cellosolve when used in conjunction herewith. Thirty ml. of waxy 30-grade western Canadian distillates of differing saturates/aromatics contents were mixed with phenol and methyl Cellosolve at various ratios thereof, in a batch extractor at atmospheric pressure at 180° F., which was below the critical solution temperatures of the particular mixed solvent system and distillate employed. After the mixture settled and raffinate and extract phases were separated, compositions of each were determined. The refractive index of the oil and the weight percent of solvent in each phase were determined, as well as the dewaxed (pour point 25° F.) viscosity index of the raffinate oil. A ternary diagram for the mixed solvent-oil system was then constructed from these phase-equilibrium data according to the method of T. G. Hunter and A. W. Nash, Ind. Eng.

Chem., 27, 836 (1935). The data for each system employed were as follows:

| System | Phenol/methyl Cellosolve | Extraction, temp., °F. |
|---|---|---|
| A | 95 wt. percent/5 wt. percent | 180 |
| B | 85 wt. percent/15 wt. percent | 180 |

The phase-equilibrium data obtained for each system are given in Table III.

TABLE III

| System | Raffinate phase | | | Extract phase | |
|---|---|---|---|---|---|
| | Refractive index of oil at 140° F. | Dewaxed viscosity index of oil | Mixed solvent (wt. percent) | Refractive index of oil at 140° F. | Mixed solvent (wt. percent) |
| A | 1.4656 | 94.8 | 13.8 | 1.4858 | 94.1 |
| | 1.4740 | 81.3 | 16.3 | 1.5258 | 87.5 |
| | 1.4843 | 67.1 | 21.4 | 1.5292 | 80.0 |
| | 1.4933 | 56.7 | 27.7 | 1.5293 | 71.2 |
| B | 1.4660 | 94.1 | 10.5 | 1.4870 | 95.1 |
| | 1.4752 | 79.5 | 12.5 | 1.5328 | 88.8 |
| | 1.4844 | 67.0 | 15.9 | 1.5372 | 81.8 |
| | 1.4938 | 56.2 | 21.0 | 1.5390 | 74.9 |

By use of established correlations between countercurrent plant extraction operations and ternary diagrams, it was found that the continous countercurrent extraction of a 30-grade distillate per System A gives a 60 volume percent yield of waxy raffinate oil of 90 viscosity index at 105 volume percent treat in five ideal extraction stages.

System B gives a 66 volume percent yield of waxy raffinate oil of 90 viscosity index at 120 volume percent treat in four ideal extraction stages.

These results may be compared with those obtained utilizing anhydrous phenol and aqueous phenol to extract the same distillate at 180° F. in approximately the same number of ideal stages. With anhydrous phenol a yield of only 54 volume percent of 90 viscosity index waxy product is obtained with a treat of 145 volume percent. With aqueous phenol containing 5% water, a yield of 64 volume percent of 90 viscosity index waxy product is obtained with a high treat of 295 volume percent. With aqueous phenol containing 10% water, a yield of 66 volume percent of 90 viscosity index waxy product is obtained at an extremely high treat of 565 volume percent.

It will be obvious to those skilled in the art that many modifications, substitutes and alternatives may be employed in conjunction with this invention without departing from its spirit or scope. All matter herein set forth is not to be considered as limiting in scope, and only such limitations should be imposed as are indicated by the appended claims.

What is claimed is:
1. A process for the upgrading of a petroleum distillate fraction comprising contacting said fraction with a mixed solvent system comprising Components A and B, wherein Component A comprises an aromatic organic compound having a 6-membered ring containing at least one polar functional group and Component B comprises a diethylene glycol ether having the general formula:

$$R-(OCH_2CH_2)_2-OH$$

where R is lower alkyl, selectively extracting polar compounds from said petroleum distillate fractions, separating extract and raffinate phases, and recovering the solvent from the extract and raffinate phases and improved hydrocarbon oil from the raffinate phase.

2. The process of claim 1 wherein the operating temperature is between 100° and 300° F.
3. The process of claim 1 wherein the ratio of Component A to Component B is between 3 and 50.
4. A process for the upgrading of a petroleum distillate fraction comprising contacting said fraction with a mixed solvent comprising Components A and B, wherein Component A is an aromatic organic compound having a boiling point of about 250° to 45° F. and having a 6-membered ring containing at least one polar functional group and Component B is a diethylene glycol monoalkyl ether under conditions such that extract and raffinate phases are formed, and recovering the mixed solvent from the extract and raffinate phases and improved hydrocarbon oil from the raffinate phase.
5. The process of claim 4 wherein said mixed solvent and said petroleum distillate fraction are contacted at a temperature of between about 100° and 300° F.
6. The process of claim 4 wherein the ratio of Component A to Component B is between 3 and 50.
7. The process of claim 4 wherein the ratio of said mixed solvent and said petroleum distillate fraction, or the treat, is between 50 and 500%.
8. The process of claim 4 wherein said polar functional group comprises a hydroxyl group.
9. The process of claim 8 wherein said Component A comprises phenol.
10. The process of claim 4 wherein said petroleum distillate fractions consist of standard lube oil fractions boiling between 500° and 1100° F., containing between 5% and 70% aromatics, said aromatics ranging from $C_{15}$ to $C_{50}$.
11. The process of claim 1 wherein Component A has a boiling point of about 250° to 450° F.
12. The process for the upgrading of a lubricating oil fraction comprising contacting said fraction wtih a mixed solvent comprising phenol and diethylene glycol monoethyl ether, forming an extract phase rich in said mixed solvent and a raffinate phase rich in improved hydrocarbon oil, and recovering said mixed solvent and said improved hydrocarbon oil therefrom.
13. The process of claim 12 wherein the said mixed solvent and said petroleum distillate fraction are contacted at a temperature between about 100° and 300° F.
14. The process for the upgrading of a lubricating oil fraction comprising contacting said fraction with a mixed solvent comprising phenol and diethylene glycol monomethyl ether, forming an extract phase rich in said mixed solvent and a raffinate phase rich in improved hydrocarbon oil, and recovering said mixed solvent and said improved hydrocarbon oil therefrom.
15. The process of claim 14 wherein the said mixed solvent and said petroleum distillate fraction are contacted at a temperature between about 100° and 300° F.
16. The process of claim 1 wherein Component A is phenol.

References Cited
UNITED STATES PATENTS

| 2,084,471 | 6/1937 | Whitely | 208—323 |
| 2,148,710 | 2/1939 | Read | 208—323 |
| 2,178,078 | 10/1939 | Martin | 208—323 |

HERBERT LEVINE, Primary Examiner

U.S. Cl. X.R.

208—334, 335

PO-1050
(5/69)

UNITED STATES PATENT OFFICE
CERTIFICATE OF CORRECTION

Patent No. 3,600,302          Dated August 17, 1971

Inventor(s) Charles C. Hong

It is certified that error appears in the above-identified patent and that said Letters Patent are hereby corrected as shown below:

Column 8, claim 4, line 9; a "0" should be inserted immediately after "45".

Line 9 should therefore read as follows:

"boiling point of about 250° to 450°F. and having a 6-"

Signed and sealed this 4th day of January 1972.

(SEAL)
Attest:

EDWARD M. FLETCHER, JR.
Attesting Officer

ROBERT GOTTSCHALK
Acting Commissioner of Patents